United States Patent [19]

Shah

[11] Patent Number: 5,636,203
[45] Date of Patent: Jun. 3, 1997

[54] METHOD AND SYSTEM FOR IDENTIFYING FAULT LOCATIONS IN A COMMUNICATIONS NETWORK

[75] Inventor: Jasvantrai C. Shah, Richardson, Tex.

[73] Assignee: MCI Corporation, Washington, D.C.

[21] Appl. No.: 481,984

[22] Filed: Jun. 7, 1995

[51] Int. Cl.$^6$ .................................................. H04L 1/00
[52] U.S. Cl. .................... 370/244; 371/20.2; 395/183.01; 370/400; 370/907
[58] Field of Search .......................... 370/14, 16, 94.3; 395/183.01; 375/211, 213, 214; 371/20.1, 20.2

[56] References Cited

U.S. PATENT DOCUMENTS

| | | | |
|---|---|---|---|
| 3,500,202 | 3/1970 | Zeqers | 375/214 |
| 4,604,745 | 8/1986 | Takasaki et al. | 375/213 |
| 5,095,482 | 3/1992 | Grallert | 371/20.2 |
| 5,233,600 | 8/1993 | Pekarske | 370/14 |

*Primary Examiner*—Benedict V. Safourek

[57] ABSTRACT

All nodes on a malfunctioned communications circuit of a communications network are enabled to identify the location of the fault causing the circuit malfunction. Upon detecting an incoming signal impairment on the circuit, each node on the circuit first assumes that the failure is on the segment of the circuit immediately upstream thereof, and accordingly sends an identifier of that fault location to its downstream nodes. Each node periodically repeats sending its identifier to its downstream nodes. A node that has sent its identifier at least a predetermined number of times without receiving a similar identifier from another node upstream thereof or without having detected a normal signal during all that time is determined to have sent out an identifier that correctly identifies the fault location on the communications circuit. If, on the other hand, a node receives a fault location identifier from a node upstream thereof before it has completed sending its identifier a predetermined number of times, then that node would stop sending its own identifier downstream. And upon receiving the same fault location identifier from an upstream node a predetermined number of times, that node further recognizes that the received identifier represents the correct location of the fault. The fault location identification process is terminated if the signal returns to the normal condition during the process.

51 Claims, 3 Drawing Sheets

METHOD AND SYSTEM FOR IDENTIFYING FAULT LOCATIONS IN A COMMUNICATIONS NETWORK

RELATED APPLICATIONS

This invention also relates to an application by W. Russ entitled "System and Method for Resolving substantially Simultaneous Bi-directional Requests of Spare Capacity", to be assigned to the same assignee as the instant invention and filed concurrently herewith having Ser. No. 08/483,578. This invention is further related to an application by Russ et al. entitled "Automated Path Verification for SHN-Based Restoration", to be assigned to the same assignee as the instant invention and filed concurrently herewith having Ser. No. 08/483,525. This invention is further related to an application by W. Russ entitled "Automated Restoration of Unrestored Link and Nodal Failures", to be assigned to the same assignee as the instant invention and filed concurrently herewith having Ser. No. 08/483,579. This invention is yet furthermore related to an application by Russ et al. entitled "Method and System for Resolving Contention of Spare Capacity Circuits of a Telecommunications Network", to be assigned to the same assignee as the instant invention and filed on Jun. 6, 1995 having Ser. No. 08/468,302.

FIELD OF THE INVENTION

The present invention relates to a telecommunications network having a plurality of intelligent nodes interconnected by a plurality of spans to have a plurality of communications circuits, and more specifically to an approach to identify the location of a fault in the event of a failure in one or more of the communications circuits or spans in the network, without resorting to a central system for fault diagnosis.

BACKGROUND OF THE INVENTION

Whenever a disruption such as a fiber cut occurs in a communications network having a plurality of nodes interconnected via a plurality of communications spans to have a plurality of communications circuits, impaired signals representative of the disruption quickly propagate in a wide area of the network beyond the point of failure. This propagation makes it difficult to identify the location of the fault. But to reroute the affected communication circuits around the failure, it is necessary to identify the point of failure. Frequently, such identification is performed by a central network management system by means of a sophisticated analysis of the alarm messages received from the affected nodes, coupled with the network topology information stored at the central system. However, such centralized approach for fault location is relatively slow and possible restoration of disrupted communication traffic to normal operation is often delayed.

With the increasing deployment of intelligent network elements, such as digital cross-connect systems, at nodes in today's communication networks, it has become possible to perform the fault identification described above, and subsequent restoration of disrupted traffic to normal operation, faster using distributed techniques rather than centralized methods. One such distributed method for locating a failed span is described in Pekarske U.S. Pat. No. 5,233,600. Pekarske teaches a method whereby, when a span in a network fails, the two nodes at each end of the failed span could identify, without assistance from a central system, that they are the custodial nodes of the failed span. The other nodes affected by the failure of the span also would identify that the spans to which they are directly connected are not the source of the failure. This identification is based on monitoring each circuit in a given span for either a directly observable signal impairment or an alarm indication signal. An idle signal is sent whenever a directly observable signal impairment or an alarm indication signal is detected. And the channel immediately upstream from the node is declared to have failed when either the directly observable signal impairment or alarm indication signal is received for longer than a predetermined period of time.

Being able to identify the failed span in the manner as described in Pekarske is sufficient to carry out a distributed link restoration procedure (which is limited to rerouting disrupted communications circuits), by the two custodial nodes of the failed span. However, a shortcoming of the Pekarske method is that the knowledge of which specific span has failed is confined to those two custodial nodes. In other words, the other nodes in the network affected by the failure would have no knowledge of the identity of the failed span. Yet in order to effect a more efficient restoration technique which may be referred to as a distributed path restoration technique for restoring each disrupted communications circuit independently of other disrupted circuits, other information such as the identity of the two adjoining nodes bracketing the failed segment of the communications circuit also needs to be made known to all nodes in the network. One of the reasons that the distributed path restoration technique is preferred over the link restoration method is that the former potentially can explore a much larger number of restoration options than the latter. Another reason is that the distributed path restoration technique requires potentially a smaller amount of spare capacity in the network than the distributed link restoration technique for providing the same level of network restoration capability.

SUMMARY OF THE INVENTION

The present invention is generally concerned with making known to all nodes of a telecommunications circuit the location of a fault on a malfunctioning communications circuit in the network. The instant invention communications network comprises a plurality of intelligent nodes interconnected by a plurality of communications spans to have a plurality of communications circuits. For the present invention, the intelligence in the nodes, as well as in the devices in the spans, can detect signal impairments in the communications circuits. These signal impairments may be represented by a loss of signal (LOS) or an alarm indication signal (AIS). The intelligence of the nodes can moreover convert a LOS to an AIS, and reformat the impaired outgoing signal when necessary so as to alert the nodes downstream that a malfunction has been detected upstream.

Whenever a communications circuit begins to malfunction, the resulting impaired signal generally propagates throughout the length of the circuit before the nodes on the circuit have a chance to react to it. Consequently, upon detecting an incoming signal impairment, each node on the circuit first assumes that the impaired segment of the circuit is immediately upstream from it. The nodes then begins to periodically transmit to the nodes downstream a fault identifier or identification, which informs the downstream nodes that the failed segment of the circuit is immediately upstream from the node. The periodic transmission of the fault identifier continues so long as the node itself is not the recipient of a similar identifier from another node upstream. And if the node succeeds in transmitting its fault identifier to its downstream nodes at least a predetermined number of times, then the node would assume that it has correctly identified the location of the fault as specified in its fault identifier. On the other hand, if a node receives a fault location identifier from a node upstream prior to having finished sending out its own identifier a predetermined number of times, it would suspend sending out its own fault identifier. Instead, the node would record the received fault identifier. Further, if a node receives the same fault identifier a predetermined number of times from an upstream node, it would assume that the received fault identifier contains the correct location of the fault.

Extending this method to all of the nodes on a malfunctioned communications circuit means that each node of that circuit can identify the correct location of the fault. The instant invention process of identifying the fault location is suspended by all nodes, and the circuit is deemed to have returned to normal operation, if an incoming signal reverts to a normal condition during the process.

The fault location identifier may include data for identifying the node that originates the identifier. It may further include information for identifying the adjoining node bracketing the malfunctioned segment of the circuit.

Following the detection of the incoming signal impairment, a node may reformat its outgoing signal to alert its downstream nodes that a failure has been detected upstream therefrom.

The identifier of the fault location may be conveyed in the form of a message. Signal formats specified in the American National Standards Institute (ANSI) standards for Synchronous Optical Network (SONET) and for Digital Service Level 3 (DS-3) signals may be utilized for reformatting the outgoing impaired signal and deriving a message channel from the overhead bits to transmit the fault location identifier.

Accordingly, it is an objective of the present invention to enable all nodes of a malfunctioned communications circuit in a communications network to learn the location of the fault causing the circuit malfunction.

Another objective of the present invention is to enable each node of a malfunctioned communications path to identify which pair of adjoining nodes from the plurality of nodes of the path bracket the span containing the failure.

BRIEF DESCRIPTION OF THE FIGURES

Other additional objectives and advantages of the present invention will become more apparent and the invention will be best understood by reference to the following description of a preferred embodiment of the invention taken in conjunction with the accompanying drawings, wherein.

DETAILED DESCRIPTION OF THE INVENTION

Figure 1:
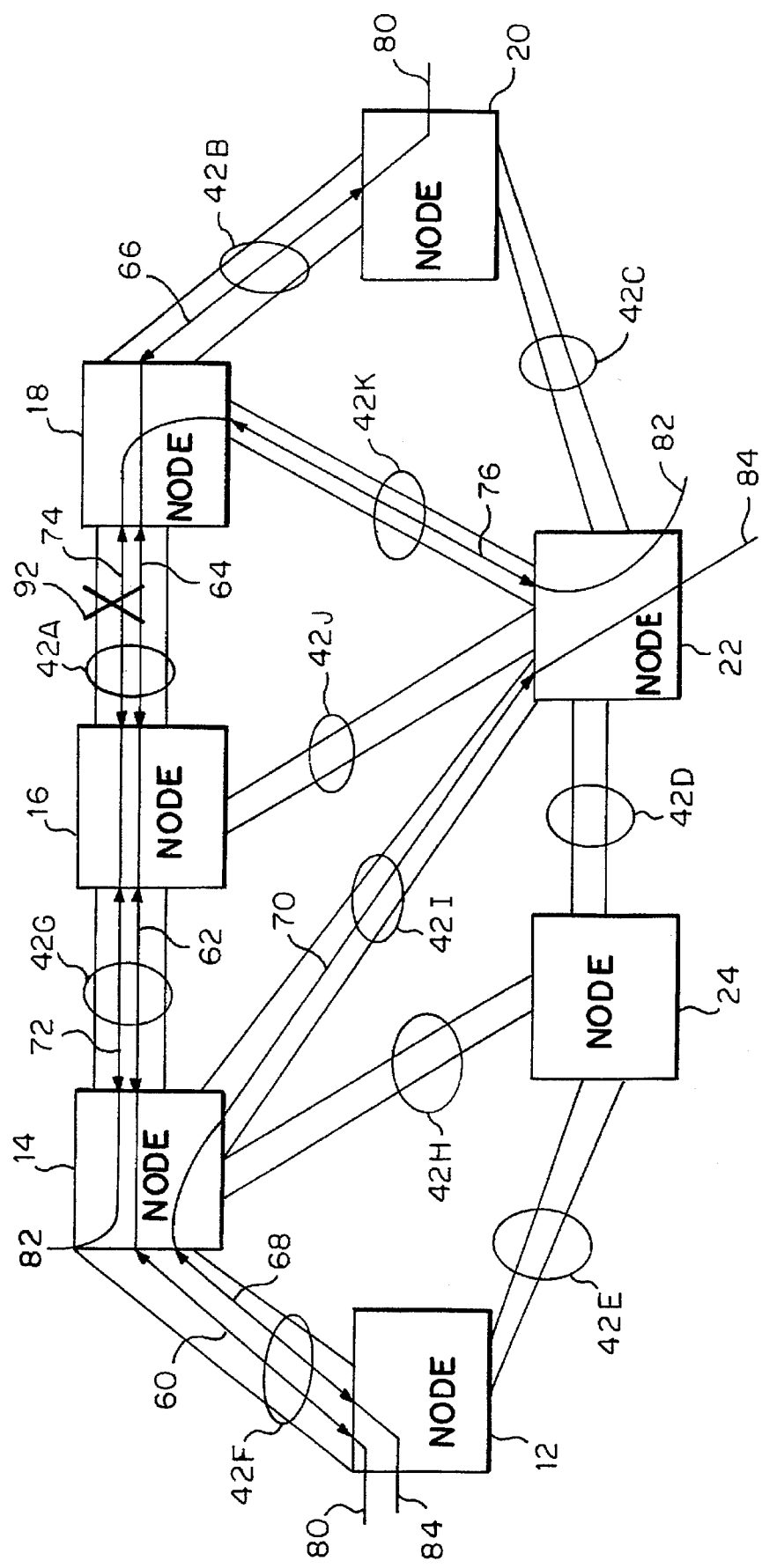
FIG. 1 is an illustration of a simplified communications network utilized to explain the present invention.

Illustrated in FIG. 1 is an exemplar telecommunications network having nodes 12, 14, 16, 18, 20, 22, and 24 interconnected by various spans 42A to 42K. Each of the nodes 12, 14, 16, 18, 20, 22 and 24 may comprise an intelligent network element such as a cross-connect switch. Although not shown, each switch has a processor, its associated memories and data storage means, and the requisite ports including detectors for effecting connection to the other switches in the adjacent nodes. Thus, each node is capable of detecting an incoming signal impairment or an incoming alarm indication signal (AIS). In addition, each node can send an AIS to its downstream nodes and perform other processing functions for identifying a fault location. Further, each node can make a decision that a detected fault in fact is not an actual fault. For example, the detected fault may actually be a glitch. An exemplar cross-connect switch is the model 1633-SX made by the Alcatel Network Systems, Inc.

Figure 2:
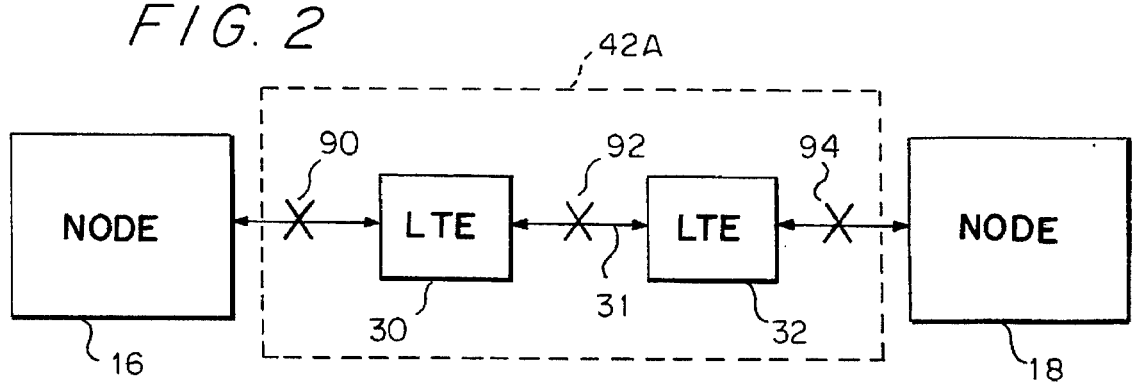
FIG. 2 is a diagram illustrative of a communications span in the FIG. 1 network.

Each of the spans 42A to 42K, as for example represented by span 42A shown in FIG. 2, has conventional line terminating equipment (LTE) 30 and 32 interconnected by a communications link 31 such as for example a fiber. LTE 30 in turn is shown to be connected to node 16 and LTE 32 to node 18. When the distance between LTE 30 and LTE 32 exceeds the equipment manufacturer's specification for a LTE, one or more repeaters may need to be inserted therebetween. For the sake of simplicity, such repeaters are not shown in FIG. 2.

There are multiple communications channels in span 42A. These channels are derived from subdividing the transmission capacity of the LTEs. For example, an Optical Carrier Level 48 (OC-48) SONET LTE can provide 48 Synchronous Transport Signal Level 1 (STS-1) communications channels. In each span 42A to 42K, some or all of the communications channels are working channels through which communications traffic traverses between the nodes connected by the span. Any remaining communications channels are kept in reserve as spare channels. When there is a failure in the network, the spare channels are put into service so that disrupted traffic can be rerouted.

As mentioned before, LTE 30 and LTE 32, for the understanding of this invention, are assumed to be intelligent devices each capable of detecting incoming signal impairments or AISs, and sending out AISs. Accordingly, with reference to FIG. 2, if a fault or signal impairment occurs between LTE 30 and LTE 32, such as at point 92, then LTE 30 would send an AIS to node 16. Similarly, LTE 32 would send an AIS to node 18. However, if the signal impairment occurs at point 90, then node 16 and LTE 30 both would detect a loss of signal (LOS). Consequently, each of node 16 and LTE 30 sends an AIS in the direction away from the failure. Similarly, if there is a signal impairment at point 94, then node 18 and LTE 32 both would detect the impaired signal and send respective AISs in the direction away from the point of failure. AIS and LOS discussed herein are borne by the communications channels affected by the failure.

For the present invention embodiment in FIG. 1, several working channels are shown. For example, working channel 60 carries traffic between nodes 12 and 14, working channel 62 carries traffic between nodes 14 and 16, working channel 64 carries traffic between nodes 16 and 18, etc. Other working channels shown in FIG. 1 are 66, 68, 70, 72, 74, and 76. To keep things simple, spare channels are not shown in FIG. 1. For the purpose of this invention, each of "adjoining nodes, adjacent nodes or custodial nodes" of a working channel (or a span) is defined to be the pair of nodes bracketing or sandwiching the working channel or the span. It should further be appreciated that each of the nodes has a priori knowledge of its neighbor nodes.

Also shown in the FIG. 1 network are communications circuits 80, 82, and 84. For the instant invention, a communications circuit, or path, is defined to have a plurality of working channels for carrying traffic between one end node and another end node in the network. As shown, each communications circuit interconnects one working channel from each of a selected group of adjoining spans through their intervening nodes starting with one end node and ending with another end node in a manner so that no loops are formed. For example, communications circuit 80 comprises, in sequence, end node 12, working channel 60, intermediate node 14, working channel 62, intermediate node 16, working channel 64, intermediate node 18, working channel 66, and finally end node 20. Communications circuit 82 in FIG. 1 similarly comprises end nodes 14 and 22, intermediate nodes 16 and 18, and working channels 72, 74, and 76. Similarly arranged and shown in FIG. 1 is communications circuit 84 between end nodes 12 and 22. It is assumed herein that each working channel, and the circuit therein used in the network of FIG. 1, is adaptable to carry bi-directional communications traffic. It is further assumed for the purpose of this invention that the communications channels belonging to each span 42 can be grouped into parcels, for example based upon certain physical considerations of the span.

Figure 3:
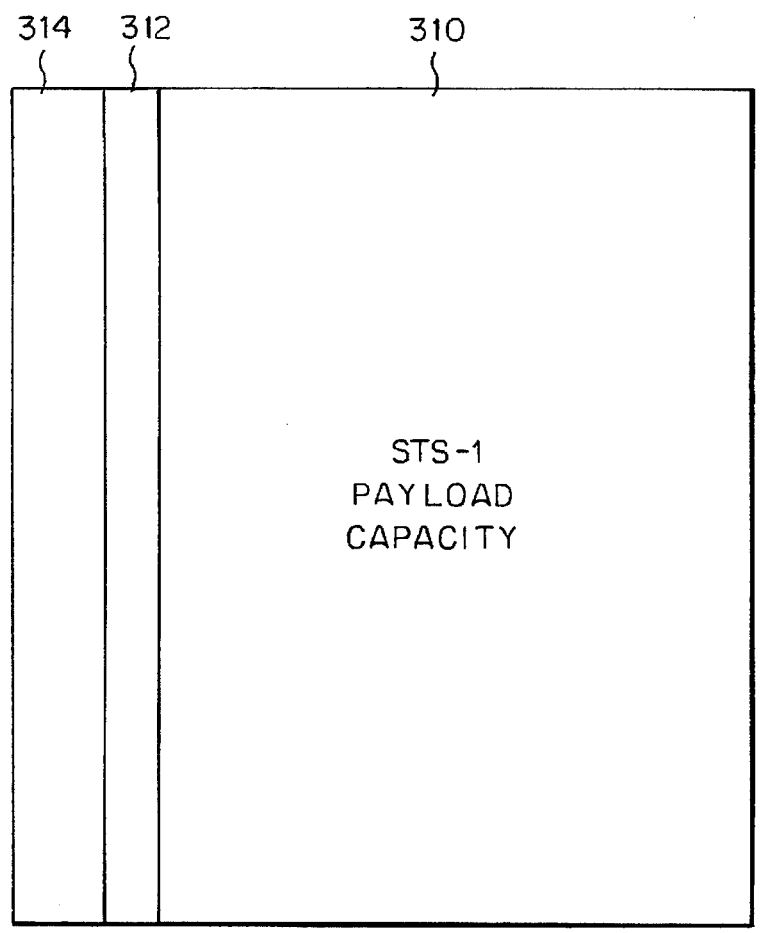
FIG. 3 is a simplified diagram illustrative of the SONET format for the communications traffic payload and overhead.
Figure 3A:
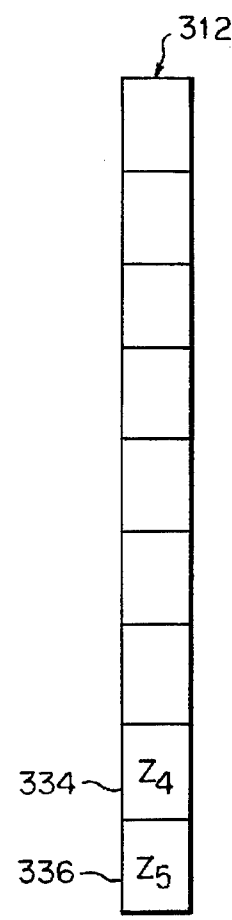
FIG. 3a illustrates in more detail components of the SONET path overhead essential to the process of the present invention.

The communications traffic carried by a communications circuit, for example communications circuit 80 in FIG. 1, is organized into payload bits and overhead bits in accordance with the format specified in the applicable standard implemented in the network. One such exemplar format illustrated in FIG. 3 is based on the SONET standard specified by the American National Standards Institute (ANSI) in the standard T1.105-199x entitled, "American National Standard for Telecommunications—Digital Hierarchy—Optical Interface Rates and Formats Specification (SONET)". According to this format, each frame of the signals transmitted by a communications circuit in an STS-1 format over a period of 125 microseconds has a traffic payload section 310 of 774 bytes, a path overhead (POH) section 312 of 9 bytes, and a transport overhead section 314 of 27 bytes. Under normal operating conditions each frame carries the actual communication traffic in payload 310, and the appropriate overhead information in POH 312 and transport overhead 314. POH 312 is further detailed in FIG. 3a to have a not being used growth byte Z4 at 334 and a tandem connection byte Z5 at 336. The use of Z4 byte 334 and Z5 byte 336 in the present invention will become apparent, infra.

Under conditions of failure, the procedure specified in the ANSI standard T1.105.05-1994 entitled, "American National Standard for Telecommunications—Synchronous Optical Network (SONET)—Tandem Connection Maintenance" may be invoked. According to this procedure, if a node detects an incoming AIS or an incoming impaired signal, it would alert its downstream nodes that there is a signal failure upstream by transmitting an incoming signal failure (ISF) indication thereto. Bits 1–4 of Z5 byte 336 are asserted, or converted, to a different state, for example from 0s to 1s in the ISF. To keep the focus on the instant invention, other steps of the signal reformatting procedure according to the ANSI SONET standard are not described herein.

Based on the ANSI SONET formats noted above, for the present invention, the process of identifying the location of the fault in a communications circuit in the network is discussed with reference to the FIG. 4 flow chart.

The process starts at block 402 where a node first detects an incoming signal impairment on a communications circuit by receiving either a loss of signal (LOS) or an AIS. An incoming LOS, upon detection by the node, is converted or changed to an outgoing AIS signal at block 404, and transmitted to nodes downstream of the AIS originated nodes. On the other hand, if an incoming AIS is detected, the node checks at block 406 to determine if an ISF is also received. If an ISF is not received at 406, or after the incoming LOS has been converted to an AIS at 404, the node asserts an ISF on the outgoing signal at block 408. The node at first assumes that the malfunctioning segment of the circuit is immediately upstream therefrom and accordingly it sends an identifier or identification of the location of the fault to the downstream nodes at block 410.

At block 412 a check is made to determine whether or not the fault location identifier has been sent downstream a predetermined number of times. If the answer is yes, then at block 414 the node confirms that the fault location identifier that it originated indeed indicates the correct location of the fault. If the answer is no, the process returns to block 406. Although not explicitly shown in FIG. 4, the transmission of the same fault location identifier at block 410 may be done periodically with an arbitrary time delay between two consecutive transmissions.

If an incoming ISF is detected at block 406, the fault location identification process proceeds to record the incoming adjoining node identifiers at block 416. If a fault location identifier is received from an upstream node, it is passed on and the node suspends sending its own originated fault location identifier downstream. A check is made at block 418 to determine whether or not the same fault location identifier has been received by the node a predetermined number of times from the upstream node. If the answer is yes, then confirmation is had by the node at block 420 that the fault location identifier in question indeed indicates the correct location of the fault. If the answer is no, the process returns to block 416. Although not shown explicitly in FIG. 4, the incoming signal is continuously monitored. And if the signal becomes normal before the fault location is confirmed, then the fault location identification process is aborted under the assumption that the signal impairment may have been caused by a temporary glitch in the signal.

Figure 5:
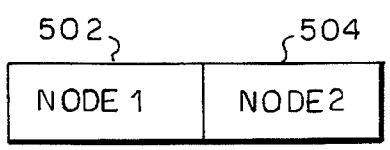
FIG. 5 shows the format of a message used to identify the fault location to other nodes.

The identifier of the fault location may contain an indicium to confirm the identity of the node originating the identifier, or it may contain indicia to confirm the identity of the node originating the identifier as well as its adjoining node which together bracket the malfunctioned segment of the circuit. Furthermore, the identifier of the fault location may be conveyed in a message format. One such format for a fault location identifier message is illustrated in FIG. 5 where the node originating the identifier message is shown as node 1 at 502 and the adjoining node bracketing the failed circuit segment as node 2 at 504. The fault location identifier messages mentioned above may be transmitted on a message channel derived from the overhead of the transmitted signal, such as from using the currently not being used byte Z4 previously shown as 334 in FIG. 3a.

Figure 4:
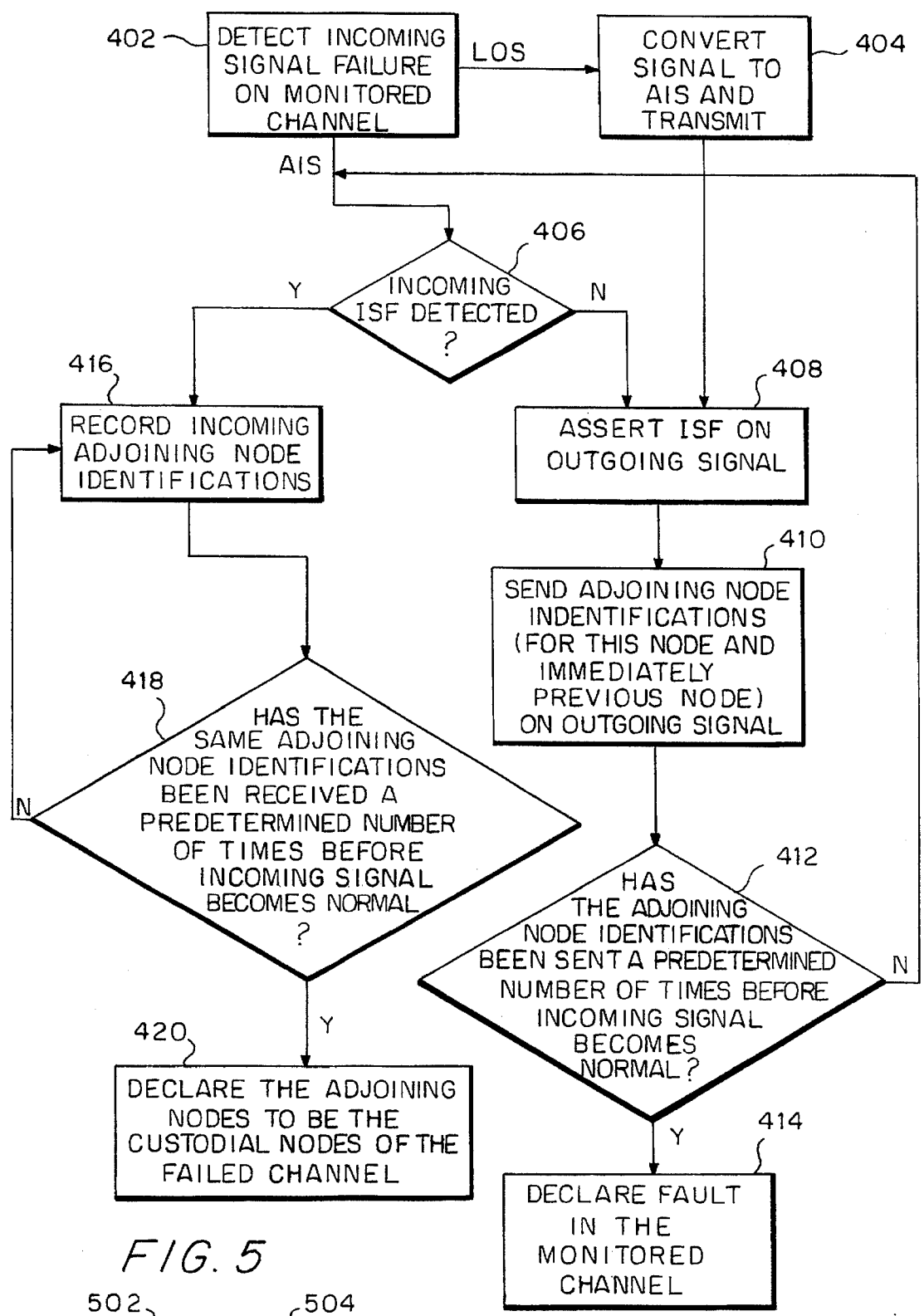
FIG. 4 is a flow chart depicting the steps of the present invention process.

The operation described in FIG. 4 is further illustrated with reference to the network of FIG. 1 herein. Assume that each node in the network of FIG. 1 monitors the communications circuit(s) passing through it. Further suppose that span 42A has failed at point 92. Working channels 64 and 74, and their respective communications circuits 80 and 82 are accordingly disrupted. The following discussion of the fault location identification process focuses only on communications circuit 80.

As working channel 64 is being monitored by each of nodes 16 and 18, the process begins when nodes 16 and 18 each detect the impaired signal. Assume that the impaired signal detected at nodes 16 and 18 is an AIS. This AIS quickly propagates throughout communications circuit 80 and, in addition to nodes 16 and 18, may also be observed by nodes 14, 12, and 20. Each of the nodes 12 to 20 of circuit 80 will check for an ISF and, failing to detect such, asserts the AIS on an outgoing IFS.

Additionally, each of the nodes 12 to 20 may at first assume that the fault is in the circuit segment immediately upstream therefrom and accordingly may send a fault location identifier to its downstream nodes. For example, node 16 will send an identifier 16-18 to node 14; and node 14, before receiving the identifier from node 16, might itself send an identifier 14-16 to node 12. Node 12, being an end node of circuit 80, may terminate the signal. Similarly, node 18 will send an identifier 18-16 to node 20. Node 20, being the other end node of circuit 80, may also terminate the signal.

Upon receipt of identifier 16-18 from node 16, node 14 will record it and pass it downstream. In addition, node 14 will cease transmitting its own outgoing identifier, for example 14-16, in its outgoing signal. Meanwhile, node 16 continues to transmit its identifier 16-18 downstream. After it has transmitted identifier 16-18 a predetermined number of times, for example 3 times, a confirmation is made by node 16 that the identifier 16-18 is indeed representative of the correct location of the fault. Similarly, nodes 14 and 12 each would reach the same conclusion after having received the same identifier, namely 16-18, a predetermined number of times, for example 3 times. Similar to the process described above, on the other side of break 92, nodes 18 and 20 each will also reach the conclusion that the correct location of the fault is given by identifier 18-16.

If the point of failure 92 is such that nodes 16, 14, and 12 each first detected a LOS, then the fault identification process is similar to the process described above with the exception that nodes 16 and 14 each would first convert the LOS to an AIS prior to asserting the ISF to an outgoing AIS signal.

Using the fault identification process described above, each of nodes 14, 16, 18, and 22 likewise can determine, from the fault location identifier transmitted respectively thereto, that the outage for communications circuit 82 is between nodes 16 and 18.

The method of identifying the location of a fault described above can also be applied to a communications network carrying Digital Signal Level 3 (DS-3) signals in accordance with the formats specified in the standard entitled "ANSI T1.107a-1989." For the DS-3 standard, to alert the downstream nodes of an upstream circuit malfunction, an AIS is replaced with an IDLE signal in step 408 of FIG. 4. Furthermore, the fault location identifier messages can be sent via, for example, the X bits in the signal overhead when the intelligence in the node and the span equipment is specifically designed to handle it.

In addition to identifying the two nodes bracketing the point of failure, a fault location identifier can also identify the span from a plurality of spans in the network that is the source of the failure. For example, as previously described, the break at 92 in FIG. 1 could be located with either of identifiers 16-18 or 18-16, each of which indicates the fault to be at span 42A between nodes 16 and 18.

In another embodiment of the present invention it may be possible to identify the location of the fault without the need to reformat the signal to alert the downstream nodes of the incoming signal failure.

While the principles of the present invention have been described in terms of various embodiments in the above discussion, the invention is not to be limited to the specific embodiments discussed above but only by the scope of the invention as defined in the appended claims.

I claim:

1. In a communications network having a plurality of nodes and a plurality of communications circuits interconnecting said nodes, each of said nodes along a communications circuit having detected a fault signal caused by a fault in said communications circuit, a method for said each node along said communications circuit to identify the location of said fault in said circuit, comprising the steps of:

transmitting periodically a fault location identifier originated by said each node onto said communications circuit;

stopping transmission of said originated fault location identifier upon receipt of another identifier or a normal signal from an upstream node; and confirming said originated fault location identifier to be representative of the correct location of said fault if said originated fault location identifier was sent at least a predetermined number of times.

2. Method of claim 1, wherein upon receipt of any incoming fault location identifier in said stopping step, the method further comprising the step of:

confirming that said any received fault location identifier is representative of the correct location of said fault when the same identifier is received said predetermined number of times and no normal signal is received before the last of said predetermined number of times.

3. Method of claim 1, further comprising the step of:

determining that there is no fault in said communications circuit if a normal signal is received prior to said confirming step.

4. Method of claim 2, further comprising the step of:

determining that there is no fault in said communications circuit if a normal signal is received prior to either of said confirming steps.

5. Method of claim 1, wherein said transmitting step further comprises the step of:

providing said fault identifier with an indicia identifying one of the nodes bracketing said fault along said communications circuit.

6. Method of claim 1, wherein said transmitting step further comprises the step of:

providing said fault identifier with indicia respectively identifying both of the nodes bracketing said fault along said communications circuit.

7. Method of claim 1, wherein after said each node has detected said fault signal, said method further comprises the step of:

reformatting said fault signal to another fault signal such that nodes downstream of said each node are informed of said fault when said another fault signal is broadcast thereto.

8. Method of claim 7, wherein said fault signal is a Synchronous Transport Signal Level 1 (STS-1) Alarm Indication Signal (AIS), said reformatting step further comprises the step of:

asserting said AIS into an Incoming Signal Failure (ISF) signal.

9. Method of claim 7, wherein said fault signal is a Digital Service Level 3 (DS-3) Alarm Indication Signal (AIS), said reformatting step further comprises the step of:

changing said DS-3 AIS into a DS-3 IDLE signal.

10. Method of claim 1, wherein said fault location identifier comprises a Synchronous Optical Network (SONET)

formatted signal having a frame with an overhead byte, said method further comprising the steps of:

using said overhead byte to store an indicium;

deriving the identification of said fault from said indicia stored in said overhead byte.

11. Method of claim 10, wherein said deriving step further comprises the step of:

using the Z4 byte in a Path Overhead (POH) of said SONET signal to derive the message channel for transmitting said fault signal.

12. Method of claim 10, wherein said fault location identifier comprises a Digital Service Level 3 (DS-3) formatted signal having an overhead bit, said method further comprising the steps of:

using said overhead bit to store an indicium;

deriving the identification of said fault from said indicia stored in said overhead bit.

13. Method of claim 12, wherein said deriving step further comprises the step of: using an X bit in said DS-3 overhead bit to derive the message channel for transmitting said fault signal.

14. A method of identifying to all nodes of a communications path of a telecommunications network the location of a fault along said path when said fault occurs in said path, said network having a plurality of nodes interconnected by a plurality of circuits, said path including a number of said nodes interconnected by a number of said circuits, said method comprising the step of:

effecting each node of said path to (i) monitor each incoming signal from nodes upstream thereof along said path;

(ii) determine if said each incoming signal is an alarm signal indicating said fault;

(iii) transmit an identifier to nodes downstream thereof along said path upon detection of said alarm signal, said identifier indicating said fault to have occurred immediately upstream thereof;

(iv) continue to transmit said identifier a predetermined number of times so long as no other identifier from a node upstream thereof or a normal signal is received by said each node;

(v) interrupt the transmission of said identifier upon receipt of either said other identifier or said normal signal; and (vi) conclude said fault to have occurred immediately upstream of said each node if said identifier is transmitted said predetermined number of times.

15. Method of claim 14, further comprising the step of:

effecting said each node to conclude said fault to have occurred immediately upstream of the node that sent said other identifier if said each node has received said other identifier said predetermined number of times.

16. Method of claim 14, further comprising the step of:

concluding said fault not to be an actual fault if said normal signal is received before said identifier has been transmitted or said other identifier has been received said predetermined number of times.

17. Method of claim 14, further comprising the step of:

providing said identifier with an indicium identifying said each node as being one of the nodes adjacent to said fault along said communications path.

18. Method of claim 14, further comprising the step of:

providing said identifier with indicia respectively identifying said each node and its custodial node which together bracket said fault along said communications circuit.

19. Method of claim 14 wherein said effecting step further comprises the step of:

reformatting said alarm signal into a fault signal for carrying said identifier to nodes downstream of said each node to inform said downstream nodes the location of said fault.

20. A method of identifying to all nodes of a communications path of a telecommunications network the location of a malfunctioned span along said path, said network having a plurality of nodes interconnected by a plurality of spans, said path including a number of said nodes interconnected by a number of said spans, said method comprising the steps of:

(a) effecting each node on either side of said malfunctioned span of said path to (i) monitor each incoming signal from nodes upstream thereof along said path;

(ii) determine if said each incoming signal is an alarm signal indicating a fault;

(iii) transmit an identifier to the nodes downstream thereof along said path upon detection of said alarm signal, said identifier indicating said fault to have occurred immediately upstream thereof toward said malfunctioned span;

(iv) continue to transmit said identifier a predetermined number of times so long as no other identifier from a node upstream thereof or a normal signal is received by said each node;

(v) interrupt the transmission of said identifier upon receipt of either said other identifier or said normal signal;

(b) each of two adjacent nodes bracketing said malfunctioned span deciding said each adjacent node to be one of the nodes bracketing said malfunctioned span if said each adjacent node has transmitted its identifier said predetermined number of times;

(c) retrieving the location of said two adjacent nodes to thereby determine the location of said malfunctioned span.

21. Method of claim 20, further comprising the step of:

concluding said span not to be malfunctioning if said normal signal is received before either of said adjacent nodes has transmitted its identifier said predetermined number of times.

22. Method of claim 20, further comprising the step of:

providing said respective identifiers of said adjacent nodes with corresponding indicia for identifying said each adjacent node to be one of the nodes bracketing said malfunctioned span along said communications path.

23. Method of claim 20 wherein said effecting step further comprises the step of:

reformatting said alarm signal into a fault signal for carrying said identifier to nodes downstream of said each node to inform said downstream nodes the location of said malfunctioned span.

24. Method of claim 23, wherein said alarm signal is a Synchronous Transport Signal Level 1 (STS-1) Alarm Indication Signal (AIS), said reformatting step further comprises the step of:

asserting said AIS into an Incoming Signal Failure (ISF) signal.

25. Method of claim 23, wherein said alarm signal is a Digital Service Level 3 (DS-3) Alarm Indication Signal (AIS), said reformatting step further comprises the step of:

changing said DS-3 AIS into a DS-3 IDLE signal.

26. Method of claim 20, wherein said identifier comprises a Synchronous Optical Network (SONET) formatted message having a frame with an overhead byte, said method further comprising the steps of:

using said overhead byte to store an indicium;

deriving the identification of said malfunctioned span from said indicia stored in said overhead byte.

27. Method of claim 26, wherein said deriving step further comprises the step of:

using the Z4 byte in a Path Overhead (POH) of said SONET message to derive the message channel for transmitting said identifier.

28. Method of claim 20, wherein said identifier comprises a Digital Service Level 3 (DS-3) formatted signal having an overhead bit, said method further comprising the steps of:

using said overhead bit to store an indicium;

deriving the identification of said malfunctioned span from said indicia stored in said overhead bit.

29. Method of claim 28, wherein said deriving step further comprises the step of:

using an X bit in said DS-3 overhead bit to derive the message channel for transmitting said identifier.

30. System for identifying to all nodes of a communications path of a telecommunications network the location of a fault along said path when said fault occurs in said path, said network having a plurality of nodes interconnected by a plurality of circuits, said path including a number of said nodes interconnected by a number of said circuits, said system comprising:

cross-connect means in each node of said path for
(i) monitoring each incoming signal from nodes upstream thereof along said path;
(ii) determining if said each incoming signal is an alarm signal indicating said fault;
(iii) transmitting an identifier to nodes downstream thereof along said path upon detection of said alarm signal, said identifier indicating said fault to have occurred immediately upstream thereof;
(iv) continuing to transmit said identifier a predetermined number of times so long as no other identifier from a node upstream thereof or a normal signal is received by said each node;
(v) interrupting the transmission of said identifier upon receipt of either said other identifier or said normal signal; and
(vi) concluding said fault to have occurred immediately upstream of said each node if said identifier is transmitted said predetermined number of times.

31. System of claim 30, wherein said cross-connect means further effects said each node to conclude said fault to have occurred immediately upstream of the node that sent said other identifier if said each node has received said other identifier said predetermined number of times.

32. System of claim 30, further comprising:

decision means for concluding said fault not to be an actual fault if said normal signal is received before said identifier has been transmitted or said other identifier has been received said predetermined number of times.

33. System of claim 30, further comprising:

means for providing said identifier with an indicium identifying said each node as being one of the nodes adjacent to said fault along said communications path.

34. System of claim 30, further comprising:

means for providing said identifier with indicia respectively identifying said each node and its custodial node which together bracket said fault along said communications path.

35. System of claim 30 wherein said effecting means further comprises:

means for reformatting said alarm signal into a fault signal for carrying said identifier to nodes downstream of said each node to inform said downstream nodes the location of said fault.

36. System for identifying to all nodes of a communications path of a telecommunications network the location of a malfunctioned span along said path, said network having a plurality of nodes interconnected by a plurality of spans, said path including a number of said nodes interconnected by a number of said spans, said system comprising:

means in each node on either side of said malfunctioned span of said path for
(i) monitoring each incoming signal from nodes upstream thereof along said path;
(ii) determining if said each incoming signal is an alarm signal indicating a fault;
(iii) transmitting an identifier to the nodes downstream thereof along said path upon detection of said alarm signal, said identifier indicating said fault to have occurred immediately upstream thereof toward said malfunctioned span;
(iv) continuing to transmit said identifier a predetermined number of times so long as no other identifier from a node upstream thereof or a normal signal is received by said each node;
(v) interrupting the transmission of said identifier upon receipt of either said other identifier or said normal signal;

means for deciding each of two adjacent nodes bracketing said malfunctioned span to be one of the nodes bracketing said malfunctioned span if said each adjacent node has transmitted its identifier said predetermined number of times; and means for retrieving the location of said two adjacent nodes to thereby determine the location of said malfunctioned span.

37. System of claim 36, further comprising:

means for deciding said span not to be malfunctioning if said normal signal is received before either of said adjacent nodes has transmitted its identifier said predetermined number of times.

38. System of claim 36, further comprising:

means for providing said respective identifiers of said adjacent nodes with corresponding indicia for identifying said each adjacent node to be one of the nodes bracketing said malfunctioned span along said communications path.

39. System of claim 38 wherein said means in said each node further comprises:

means for reformatting said alarm signal into a fault signal for carrying said identifier to nodes downstream of said each node to inform said downstream nodes the location of said malfunctioned span.

40. System of claim 36, wherein said alarm signal is a Synchronous Transport Signal Level 1 (STS-1) Alarm Indication Signal (AIS); and wherein said means in said each node further converts said AIS into an Incoming Signal Failure (ISF) signal.

41. System of claim 36, wherein said alarm signal is a Digital Service Level 3 (DS-3) Alarm Indication Signal (AIS);

wherein said means in said each node further converts said DS-3 AIS into a DS-3 IDLE signal.

42. System of claim 36, wherein said identifier comprises a Synchronous Optical Network (SONET) formatted message having a frame with an overhead byte, said system further comprising:

an indicium stored in said overhead byte;

means for deriving the identification of said malfunctioned span from said indicia stored in said overhead byte.

43. System of claim 42, wherein said deriving means further uses the Z4 byte in a Path Overhead (POH) of said SONET message to derive the message channel for transmitting said identifier.

44. System of claim 36, wherein said identifier comprises a Digital Service Level 3 (DS-3) formatted signal having an overhead bit, said system further comprising:

an indicium stored in said overhead bit;

means for deriving the identification of said malfunctioned span from said indicia stored in said overhead bit.

45. System of claim 44, wherein said deriving means further uses an X bit in said DS-3 overhead bit to derive the message channel for transmitting said identifier.

46. In a communications network having a plurality of nodes and a plurality of communications circuits interconnecting said nodes, each of said nodes along a communications circuit having detected a fault signal caused by a fault in said communications circuit, apparatus in said each node for identifying the location of said fault in said circuit, comprising:

means for transmitting periodically a fault location identifier originated by said each node onto said communications circuit;

means for stopping transmission of said originated fault location identifier upon receipt of another identifier or a normal signal from an upstream node; and means for confirming said originated fault location identifier to be representative of the correct location of said fault if said originated identifier was sent at least a predetermined number of times.

47. Apparatus of claim 46, wherein upon receipt of any incoming fault location identifier, further comprising:

means for confirming that said any received fault location identifier is representative of the correct location of said fault when the same identifier is received said predetermined number of times and no normal signal is received before the last of said predetermined number of times.

48. Apparatus of claim 46, further comprising:

means for determining that there is no fault in said communications circuit if a normal signal is received prior to said originated fault location identifier having been sent said predetermined number of times.

49. Apparatus of claim 46, further comprising:

an indicium identifying one of the nodes bracketing said fault along said communications circuit being provided in said fault location identifier.

50. Apparatus of claim 46, further comprising:

indicia respectively identifying both of the nodes bracketing said fault along said communications circuit being provided in said fault location identifier.

51. Apparatus of claim 46, said apparatus further comprising:

means for reformatting said fault signal to another fault signal such that nodes downstream of said each node are informed of said fault when said another fault signal is broadcast thereto after said each node has detected said fault signal.

* * * * *